(12) United States Patent
Allegato et al.

(10) Patent No.: US 8,931,328 B2
(45) Date of Patent: Jan. 13, 2015

(54) MULTILAYER STRUCTURE HAVING A MICROFLUIDIC CHANNEL AND A SYSTEM FOR DETECTING LEAKAGE FROM THE MICROFLUIDIC CHANNEL, AND METHOD OF DETECTING LEAKAGE IN A MICROFLUIDIC DEVICE

(75) Inventors: Giorgio Allegato, Monza (IT); Matteo Perletti, Trezzo (IT); Laura Oggioni, Agrate Brianza (IT); Francesco Tripodi, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 177 days.

(21) Appl. No.: 13/534,997

(22) Filed: Jun. 27, 2012

(65) Prior Publication Data

US 2013/0000388 A1 Jan. 3, 2013

(30) Foreign Application Priority Data

Jun. 28, 2011 (IT) .............................. TO2011A0565

(51) Int. Cl.
  *G01N 25/56* (2006.01)
  *B01J 19/00* (2006.01)
  *B01L 3/00* (2006.01)
  *G01M 3/28* (2006.01)

(52) U.S. Cl.
  CPC ....... *B01J 19/0093* (2013.01); *B01L 3/502707* (2013.01); *G01M 3/2846* (2013.01); *B01J 2219/00783* (2013.01); *B01J 2219/0095* (2013.01); *B01J 2219/00952* (2013.01); *B01J 2219/00963* (2013.01); *B01J 2219/00981* (2013.01); *B01L 2200/143* (2013.01); *B01L 2200/0689* (2013.01); *B01L 2200/146* (2013.01); *B01L 2300/0645* (2013.01); *B01L 2400/0487* (2013.01); *B01L 2400/049* (2013.01)
  USPC .................................................. 73/40; 73/588

(58) Field of Classification Search
  CPC .. B01I 2300/0887; F04B 51/00; B24B 37/30; B24B 47/06; B24B 49/16; B24B 53/017; B81B 2201/0257; G06K 9/00523; G06K 9/4671; G01C 19/5726; G01C 19/56; G01N 2291/044; G01N 29/043; G01N 2291/0231; H01L 2924/00
  USPC ............................................ 73/40.5, 588, 40
  See application file for complete search history.

(56) References Cited

U.S. PATENT DOCUMENTS

| | | | |
|---|---|---|---|
| 2004/0237657 A1* | 12/2004 | Xie et al. | 73/718 |
| 2005/0243500 A1* | 11/2005 | Xie et al. | 361/503 |
| 2008/0261345 A1 | 10/2008 | Villa et al. | |
| 2010/0008834 A1 | 1/2010 | Lohf et al. | |

FOREIGN PATENT DOCUMENTS

| | | |
|---|---|---|
| EP | 1955762 A1 | 8/2008 |
| JP | 2000-180092 A | 6/2000 |
| WO | 2007048641 A2 | 5/2007 |

* cited by examiner

*Primary Examiner* — Peter Macchiarolo
*Assistant Examiner* — Mohammed Keramet-Amircola
(74) *Attorney, Agent, or Firm* — Seed IP Law Group PLLC

(57) ABSTRACT

A multilayer structure includes: a microfluidic circuit, delimited at least in part by a first sealing structure; a fluid-tight chamber delimited in part by a second sealing structure and in part by the first sealing structure, which is arranged in the fluid-tight chamber and is configured to provide a signal indicative of a leakage between the microfluidic circuit and the fluid-tight chamber.

28 Claims, 6 Drawing Sheets

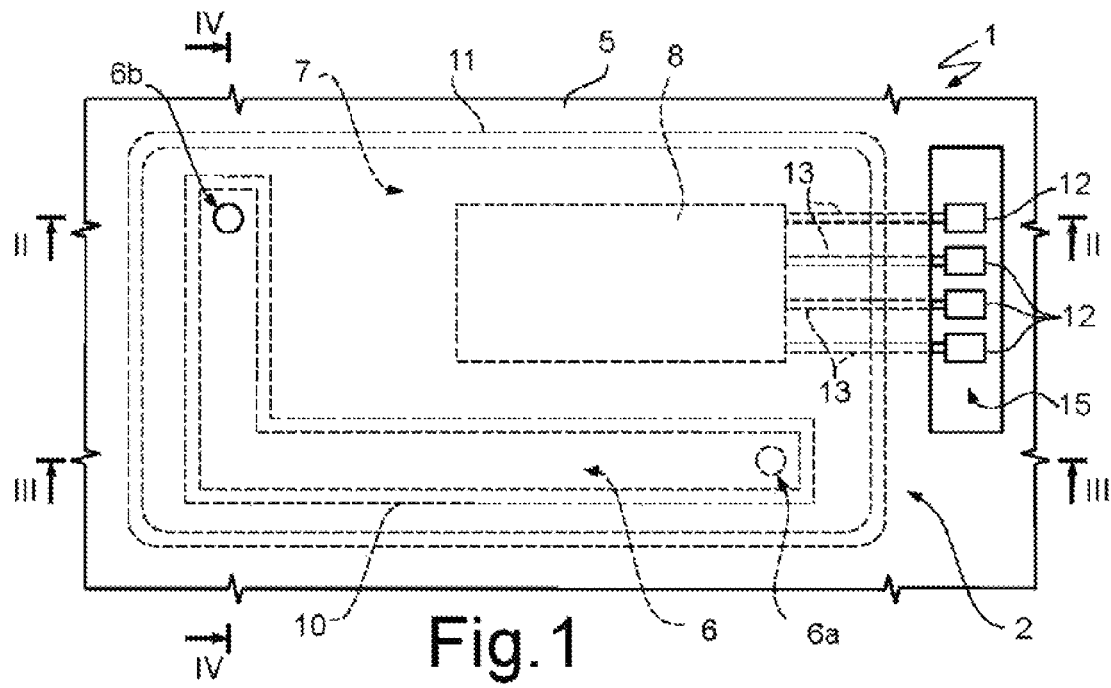
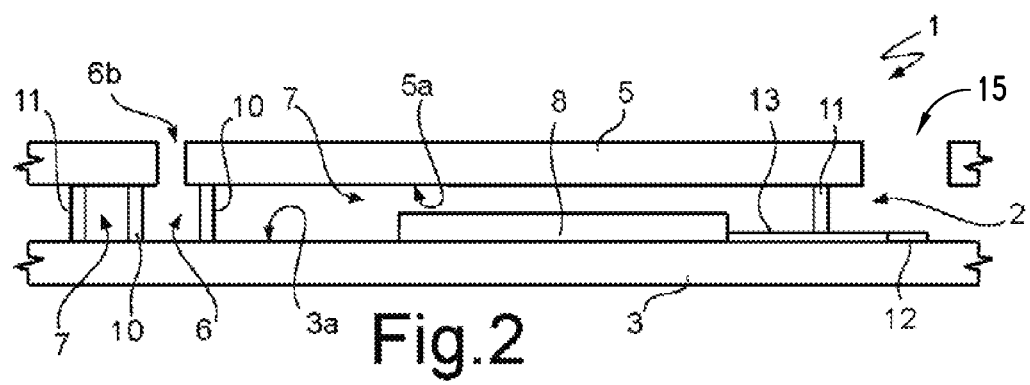
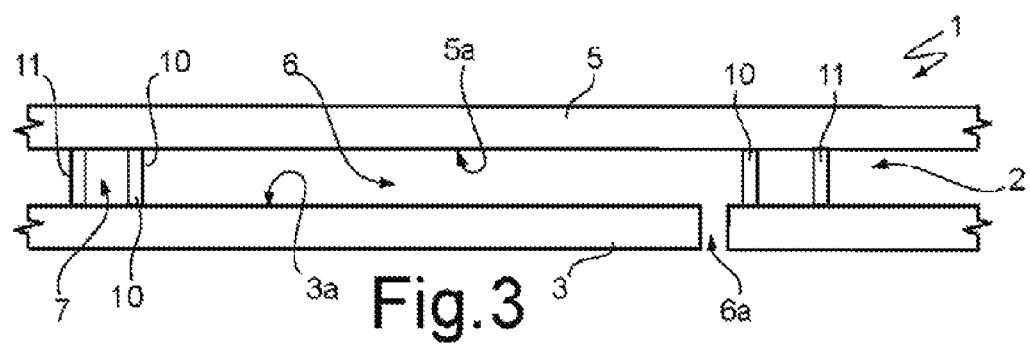

US 8,931,328 B2

MULTILAYER STRUCTURE HAVING A MICROFLUIDIC CHANNEL AND A SYSTEM FOR DETECTING LEAKAGE FROM THE MICROFLUIDIC CHANNEL, AND METHOD OF DETECTING LEAKAGE IN A MICROFLUIDIC DEVICE

BACKGROUND

1. Technical Field

The present disclosure relates to a multilayer structure having a microfluidic channel and a system for detecting leakage from the microfluidic channel and to a method of detecting leakage in a microfluidic device.

2. Description of the Related Art

As is known, numerous microfluidic devices use embedded microfluidic channels for displacing amounts of fluid in controlled conditions, according to the operations that are to be carried out. Examples of microfluidic devices provided with embedded microfluidic channels are microreactors for biochemical analyses (for example, for analyses of nucleic acids), microfluidic actuators, microelectromechanical devices, valves, printer heads for ink-jet printing devices and so on.

It is desirable for the channels to be perfectly sealed and for there not to be any leakage, in such a way that the passage of fluid occurs exclusively through inlets and outlets of the channels. A leakage of fluid not envisaged could in fact cause malfunctioning and contamination of the devices or of the surrounding environment. The latter eventuality can prove particularly serious in the case of microreactors in which biological specimens containing infectious pathogenic agents or toxic substances are treated.

The microfluidic devices are tested using purposely provided instruments and methods in order to identify any possible leakage.

A known method enables helium-leak tests to be carried out. A microfluidic device is introduced into a chamber, and the microfluidic channels are connected to a testing apparatus through an external fluidic sealed line.

The microfluidic channels are brought into conditions of marked negative pressure with respect to the environment in the chamber (pressure lower than 1 mTorr) using vacuum pumps. Then, through a separate supply line, helium is introduced into the chamber in the proximity of the microfluidic device. More precisely, a fine needle is used for injecting helium around the device, in the proximity of each junction of the microfluidic system. A mass spectrometer measures the flowrate of helium that leaks from the chamber through the microfluidic channels.

A different method consists, instead, in pressurizing the microfluidic channels by a syringe pump. The microfluidic channels are sealed with a membrane, in such a way that the system formed by the channels, by the pump, and by the connection ducts is closed. The pressure in the channels and the strains of the membrane are measured and compared with theoretical pressures and strains determined on the basis of the mass of air injected and of the laws of ideal gases. The deviations with respect to the theoretical values are indicative of leakage. Alternatively, it is possible to draw up a balance between the flow of air at inlet and the flow of air at outlet, which must be the same if the seal is efficient. The presence of leakage causes the incoming flow of air to be lower than the outgoing flow of air.

The known methods and instruments enable characterization with a good degree of precision of leakage in the microfluidic devices, but suffer from some limitations.

Principally, the tests can be carried out only on finished devices assembled in the respective packages. In many cases, however, the microfluidic devices are produced by exploiting working techniques typical of microelectronics or in any case by assembling wafers of various materials, which are divided into numerous items. It would hence be desirable to provide testing procedures that may be applied at a wafer level, in a much more economical way. Current testing methods, instead, are very slow and hence costly.

BRIEF SUMMARY

Some embodiments of the present disclosure provide a multilayer structure and a method of detecting leakage in a microfluidic device that will enable the limitations described to be overcome.

According to the present disclosure, a multilayer structure and a method of detecting leakage in a microfluidic device are provided as defined in claim 1 and claim 16, respectively.

BRIEF DESCRIPTION OF THE SEVERAL VIEWS OF THE DRAWINGS

For a better understanding of the disclosure, some embodiments thereof will be now described, purely by way of non-limiting example and with reference to the attached drawings, wherein:

FIG. 1 is a top plan view of a multilayer structure according to a first embodiment of the present disclosure;

FIG. 2 is a cross section through the multilayer structure of FIG. 1, taken according to the line II-II of FIG. 1;

FIG. 3 is a cross section through the multilayer structure of FIG. 1, taken according to the line III-III of FIG. 1;

DETAILED DESCRIPTION

Figure 4:
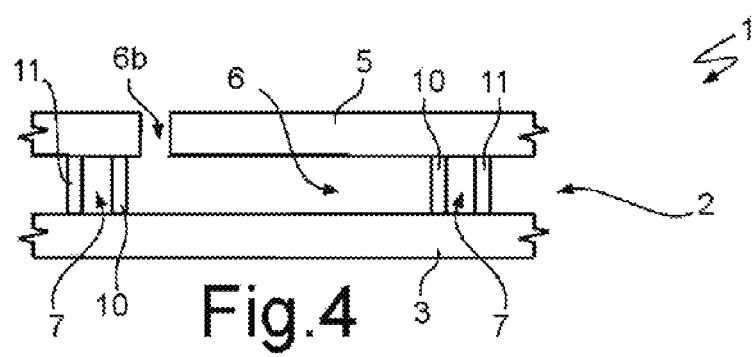
FIG. 4 is a cross section through the multilayer structure of FIG. 1, taken according to the line IV-IV of FIG. 1.

FIGS. 1-4 show a portion of a multilayer structure, designated as a whole by the reference number 1. The multilayer structure 1 incorporates a plurality of microfluidic devices 2, only one of which is illustrated in FIGS. 1-4.

The microfluidic device 2 may be, for example but not exclusively, a device for biochemical analyses, a microreactor, a printer head for an ink jet printing device, etc. For simplicity, in what follows reference will be made to said single microfluidic device, it being understood that what is described and illustrated applies to all the examples present in the multilayer structure 1.

The multilayer structure 1 comprises a first wafer 3 and a second wafer 5, defined between which is the microfluidic device 2. The first wafer 3 and the second wafer 5 may be made of various materials, amongst which are, for example, silicon, glass, ceramic, and polymeric materials. In the embodiment shown in FIGS. 1-4, in particular, the first wafer 3 and the second wafer 5 are made of a non-conductive polymeric material.

The microfluidic device 2 comprises a microfluidic circuit 6, here represented by way of example by a single microfluidic channel, a sealed chamber 7, and a pressure sensor 8.

In greater detail, the microfluidic circuit 6 and the sealed chamber 7 are defined by faces 3a, 5a of the first wafer 3 and of the second wafer 5, respectively, by a first sealing structure 10, and by a second sealing structure 11.

The first sealing structure 10 and the second sealing structure 11 are walls arranged between the first wafer 3 and the second wafer 5, to which both are coupled in a fluid-tight way, and which moreover function as spacer elements. In one embodiment, the first sealing structure 10 and the second sealing structure 11 are made of polymeric material, in particular photoresist. Alternatively, it is also possible to use, though not exclusively, different polymeric materials (such as polyester, polyethylene, polyimide) or materials such as metal (for example gold, copper or aluminum), eutectic alloys, polycrystalline silicon, silicon oxide, fiberglass, resin, epoxy resin. In the case of metal materials, the sealing structures may be obtained by thermocompression welding or eutectic bonding. In general, the first sealing structure 10 and the second sealing structure 11 may be obtained from a single layer joined to the first wafer 3 or to the second wafer 5, which functions as support, and hence is defined by removal of material, for example using photolithographic techniques. Bonding of the layer to the wafer that functions as support may be provided, for example, by gluing, welding, lamination or direct deposition of material. Once again, for example in the case where the wafer that functions as support is made of semiconductor material, the layer can be grown on the wafer and then defined by wet or dry etching.

The first sealing structure 10 and the second sealing structure 11 extend along respective closed lines, and the second sealing structure 11 encloses the first sealing structure 10.

The first sealing structure 10 delimits inside it the microfluidic circuit 6, which is provided, at opposite ends, with an inlet 6a and an outlet 6b provided in the first wafer 3 and in the second wafer 5, respectively.

The sealed chamber 7 is defined in the space comprised between the first wafer 3, the second wafer 5, the first sealing structure 10, and the second sealing structure 11. The microfluidic device 2 is made in such a way that the pressure inside the sealed chamber 7 is significantly different from the external pressure (approximately 1 atm=101325 Pa). In one embodiment, the pressure inside the sealed chamber 7 is lower than the external pressure and is, for example, approximately $10^{-3}$ atm. In a different embodiment, instead, the pressure inside the sealed chamber 7 is higher than the external pressure and is, for example, approximately 2 atm. The desired pressure in the sealed chamber 7 is obtained by completing the process of bonding of the first wafer 3, of the second wafer 5, of the first sealing structure 10, and of the second sealing structure 11 in controlled conditions of pressure. It should be noted that the same controlled pressure can be obtained also in the case where the bonding of portions (dice) of the wafers 3, 5 and of the sealing structures 10, 11 is carried out at the device level (chip-to-chip bonding) or at an intermediate level (chip-to-wafer bonding), instead of at a wafer level (wafer bonding).

The pressure sensor 8 is set on the first wafer 3 inside the sealed chamber 7 and is a microelectromechanical sensor with a capacitive or piezoresistive membrane, for example of the type described in the document US2008/0261345, assigned to STMicroelectronics Srl and incorporated herein by reference in its entirety. The pressure sensor 8, in particular, supplies a signal indicative of the difference of pressure between a reference chamber, delimited by a membrane, and the environment around the sensor (in this case, the sealed chamber 7). The pressure in the reference chamber is constant, and hence variations of pressure outside the reference chamber modify the state of strain of the membrane. The strain of the membrane can be detected through the capacitive coupling with the opposite face of the reference chamber or else by providing piezoresistive elements on the membrane itself.

The pressure sensor 8 is connected to contact pads 12 through electrical-connection lines 13, here shown only partially. In the embodiment described, the electrical-connection lines 13 run on the face 3a of the wafer, traversing the second sealing structure 11. If the second sealing structure 11 is made of metal, the electrical-connection lines 13 are conveniently insulated. The contact pads 12 are accessible from outside through an opening 15 in the second wafer 5 for enabling connection with the pressure sensor 8, for example in order to carry out tests at a wafer level.

Figure 5:
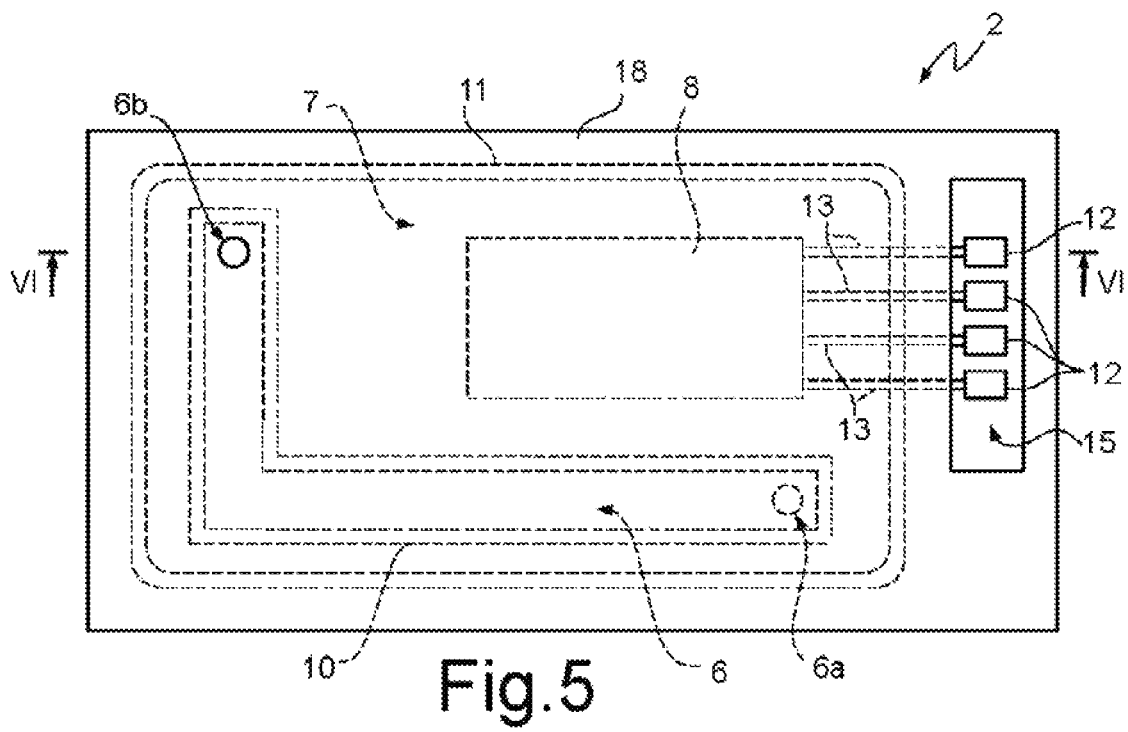
FIG. 5 is a top plan view of a microfluidic device obtained by dicing the multilayer structure of FIG. 1.
Figure 6:
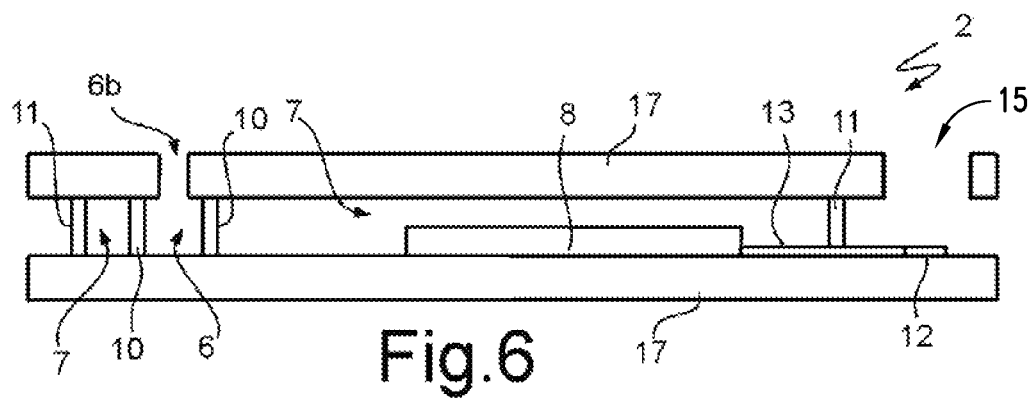
FIG. 6 is a cross section through the microfluidic device of FIG. 1, taken according to the line VI-VI of FIG. 5.

The multilayer structure 1 is designed to be divided into dice, each of which is still a multilayer structure and contains a single microfluidic device 2, defined between a first chip 17, obtained from the first wafer 3, and a second chip 18, obtained from the second wafer 5 (FIGS. 5 and 6).

Figure 7:
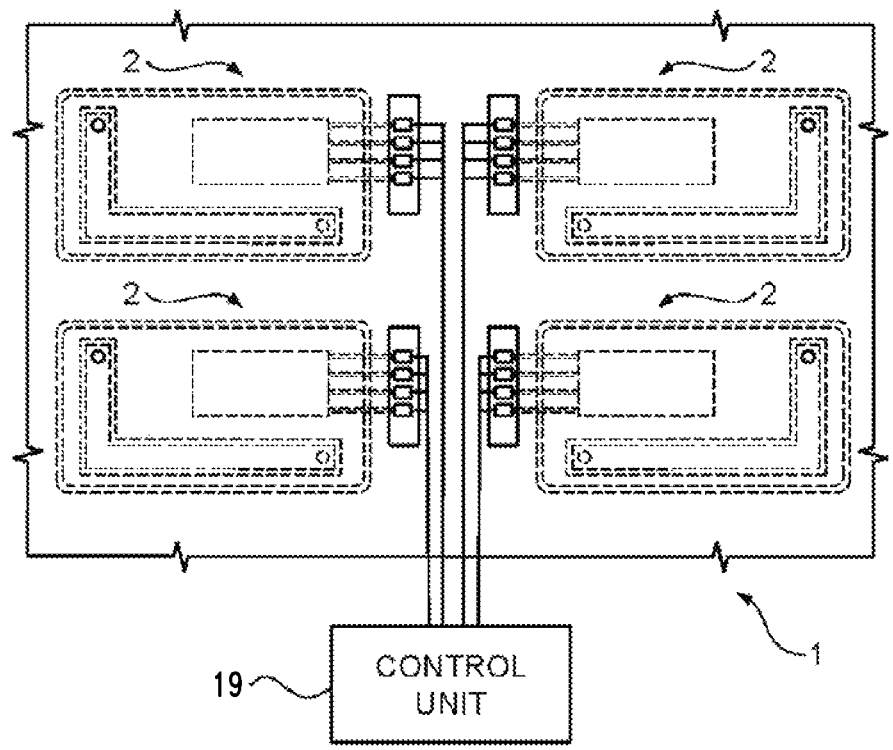
FIG. 7 is a top plan view of the multilayer structure of FIG. 1 in a testing step.
Figure 8:
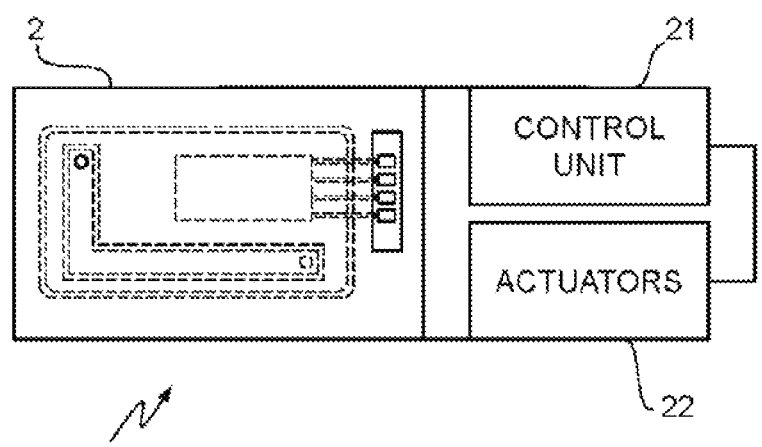
FIG. 8 is a simplified block diagram incorporating the microfluidic device of FIG. 5.

The tests can be conducted at a wafer level, by connecting an external control unit 19 to the pressure sensor 8 as shown schematically in FIG. 7, or else on the single device, even immediately before or during its use. In this case (FIG. 8), the microfluidic device 2 is integrated in a system 20 comprising a control unit 21 and actuators 22, controlled by the control unit 21 for the movement of fluids in the microfluidic circuit 6 and for carrying out supplementary functions for operation of the microfluidic device 2.

The pressure inside the sealed chamber 7 of each device is measured through the respective pressure sensor 8. In the absence of leakage, the internal pressure of the sealed chambers 7 remains stably at the initial value, which differs significantly from atmospheric pressure. If the microfluidic circuit 6 is not perfectly sealed, the leakage of fluid between the microfluidic circuit 6 and the sealed chamber 7 causes a variation of the internal pressure, which is detected by the pressure sensor 8. Detection of pressure may be carried out either in the factory, during validation of the microfluidic device 2, or in use. In particular, the values of pressure can be periodically measured and compared with a reference value stored in the control unit 21. If the deviation of the pressure inside the sealed chamber 7 oversteps a threshold, the control unit 21 generates a warning message signalling any possible malfunctioning due to defects in the seal of the microfluidic circuit 6.

Figure 9:
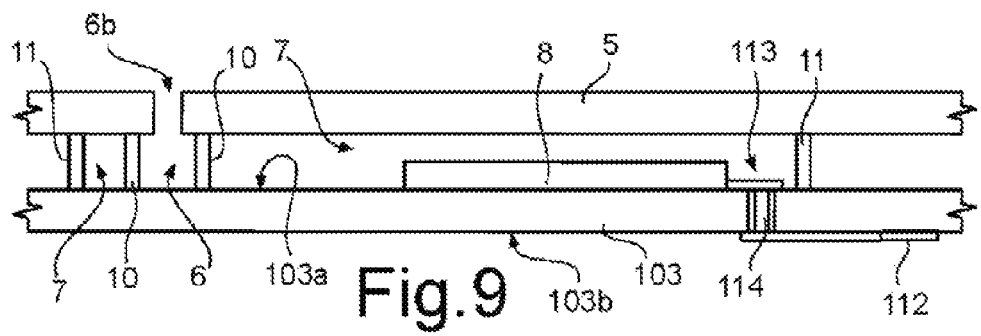
FIG. 9 is a cross section through a multilayer structure according to a second embodiment of the present disclosure.

In the embodiment illustrated in FIG. 9, the first wafer 103 is made of silicon. Contact pads 112 and portions of electrical-connection lines 113 are made on a face 103b of the first wafer 103 opposite to the face 103a where the pressure sensor 8 is located. The electrical-connection lines 113 further comprise through vias 114 perpendicular to the faces 103a, 103b of the first wafer 103 and insulated therefrom.

Figure 10:
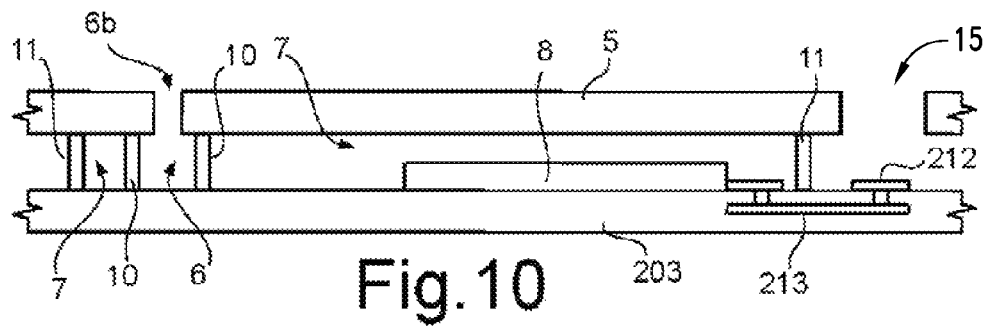
FIG. 10 is a cross section through a multilayer structure according to a third embodiment of the present disclosure.

In a further embodiment, illustrated in FIG. 10, the first wafer 203 is made of silicon, and electrical-connection lines 213 are embedded therein. The electrical-connection lines 213 may be made of metal (for example, copper or aluminum) or else doped polysilicon. The electrical-connection lines 213 are connected to contact pads 212 that are access through the opening 15 in the wafer In the embodiments of FIGS. 9 and 10, the adhesion of the first sealing structure and of the second sealing structure to the first wafer is facilitated, because any intersection with the electrical-connection lines is avoided.

Figure 11:
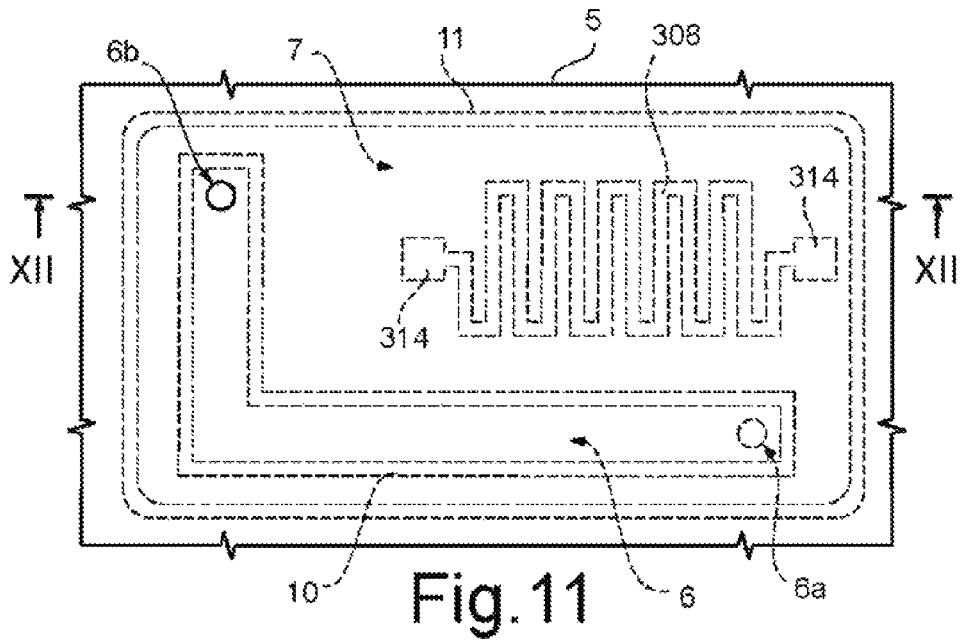
FIG. 11 is a top plan view of a multilayer structure according to a fourth embodiment of the present disclosure.
Figure 12:
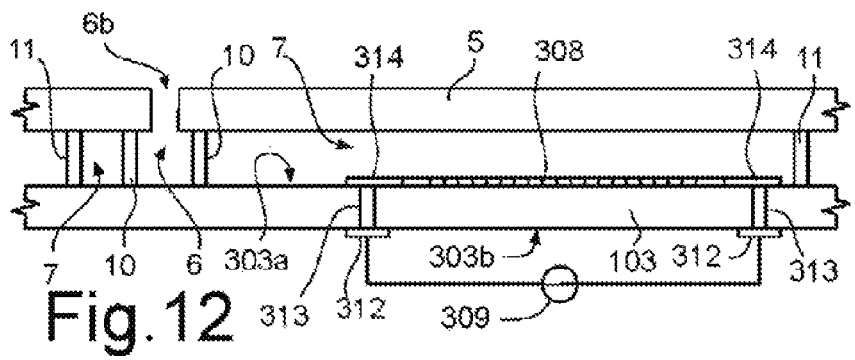
FIG. 12 is a cross section through the multilayer structure of FIG. 11, taken according to the line XII-XII of FIG. 11.

According to the embodiment illustrated in FIGS. 11 and 12, as pressure sensor 308 for detecting the pressure in the sealed chamber 7 a Pirani sensor is used. In particular, the pressure sensor 308 comprises a metal strip, for example platinum, deposited inside the sealed chamber 7 on the face 303a of the first wafer 303, which is made of silicon. By through vias 313 terminals 314 of the pressure sensor 308 are connected to contact pads 312 that are set on the face 303b of the first wafer 303. The pressure sensor 308 is moreover supplied by a voltage source 309.

A Pirani sensor provides an indirect pressure measurement, exploiting the different heat exchange with the surrounding environment as a result of the higher or lower density of the gas in which the sensor is immersed. In greater detail, the metal strip that defines the pressure sensor 308 heats up by the Joule effect when a current flows through it. The dissipation of heat, in addition to being due to irradiation, is due to the impact with the molecules of the gas around the pressure sensor 308. The higher the pressure and the density of the gas, the greater the dissipation of heat and hence the lower the temperature of the pressure sensor 308. In turn, the temperature of the sensor affects the resistivity thereof, which is hence indicative of the pressure in the sealed chamber 7 and can be easily measured. Since possible variations of the external ambient temperature can be easily compensated, the variations of pressure are basically caused by leakage through the microfluidic circuit 6.

Figure 13:
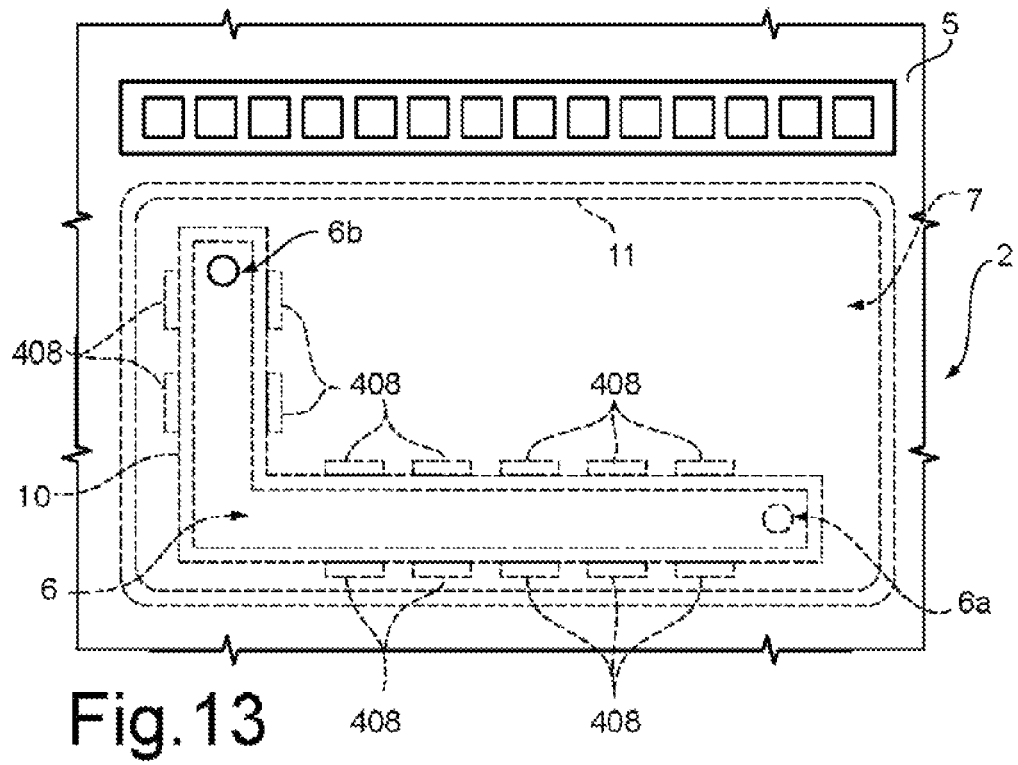
FIG. 13 is a top plan view of a multilayer structure according to a fifth embodiment of the present disclosure.
Figure 14:
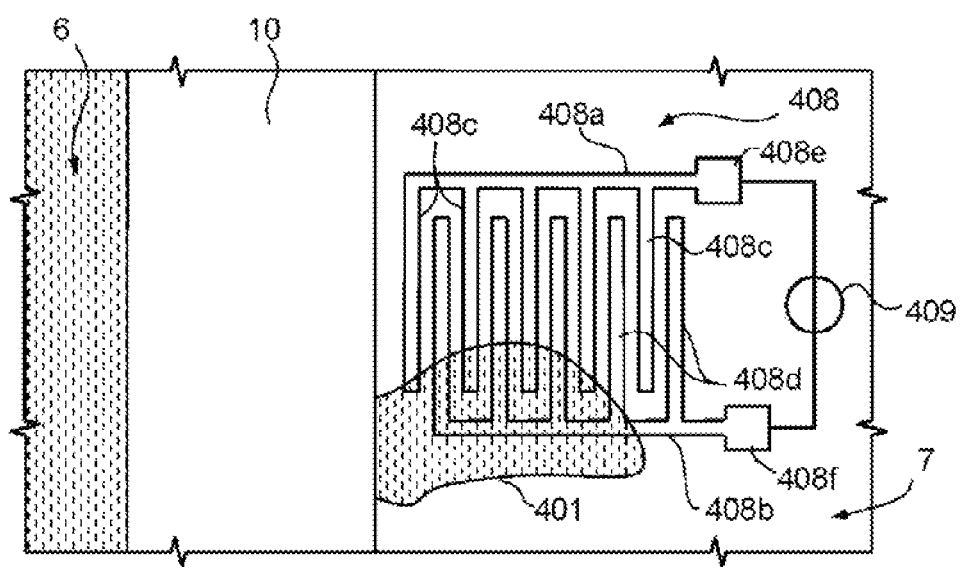
FIG. 14 shows an enlarged detail of the multilayer structure of FIG. 13.

FIGS. 13 and 14 illustrate a further embodiment of the disclosure, in which the integrity of the seal of the microfluidic circuit 6 is verified using sensors for detecting the presence of liquid 408 set around the microfluidic circuit 6, at a short distance from the first sealing structure 10.

One of the sensors for detecting the presence of liquid 408 is shown in greater detail in FIG. 14 and comprises conductive regions adjacent to one another and to the first sealing structure 10, electrically insulated from one another and biased at respective distinct voltages, in such a way that the presence of a conductive liquid that leaks from the microfluidic circuit 6 will cause a short circuit and hence a high passage of current. In the embodiment illustrated, in particular, each sensor for detecting the presence of liquid 408 comprises a first conductive region 408a and a second conductive region 408b, which may be made of metal or doped polysilicon. The first conductive region 408a and the second conductive region 408b are arranged at a short distance from one another on the first wafer 403, the surface 403a of which is electrically insulating. For example, the surface 403a is made of intrinsic silicon or else of silicon oxide. The first conductive region 408a and the second conductive region 408b are without insulating coating, and the electrical insulation is obtained through the surface 403a of the first wafer 403.

The first conductive region 408a and the second conductive region 408b are both comb-shaped and have each a back and a plurality of teeth 408c, 40d. In addition, the teeth 408c of the first conductive region 408a are interspersed with the teeth 408d of the second conductive region 408b, whilst respective terminals 408e, 408f for connection to a voltage source 409 are formed at the ends of the backs.

In case of leakage of liquid (designated by 401 in FIG. 14) from the microfluidic circuit 6, some teeth of the first conductive region 408a and of the second conductive region 408b are covered and short-circuited, thus causing a discharge. Of course, the liquid in the microfluidic channel 6 must be electrically conductive to be detected in this embodiment, as is in effect the case in a wide range of applications (for example, the biological specimens treated in microreactors for biochemical analyses and the inks in heads of ink-jet printing devices have an aqueous base and are conductive).

Figure 15:
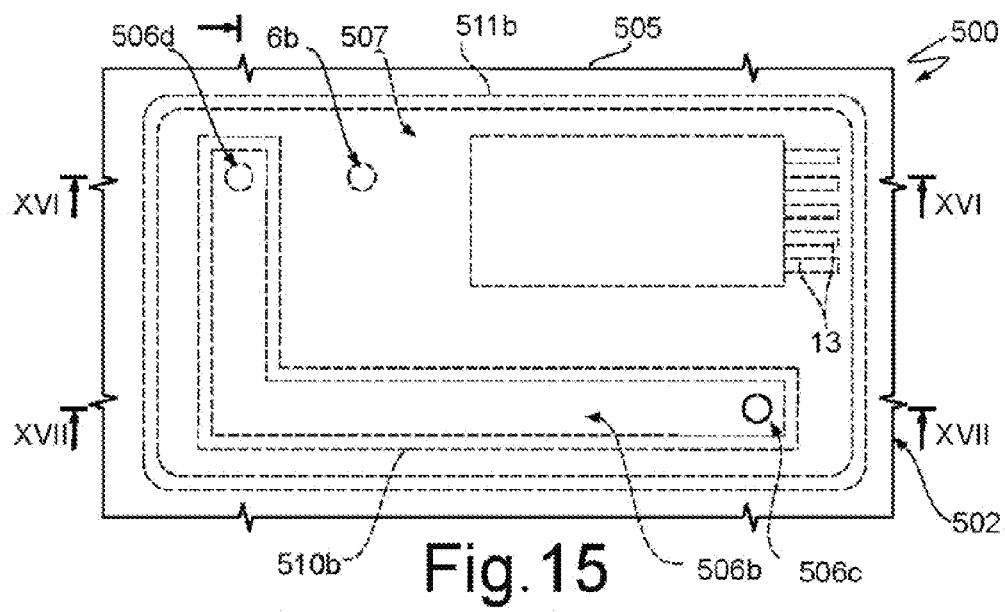
FIG. 15 is a top plan view of a multilayer structure according to a sixth embodiment of the present disclosure.
Figure 16:
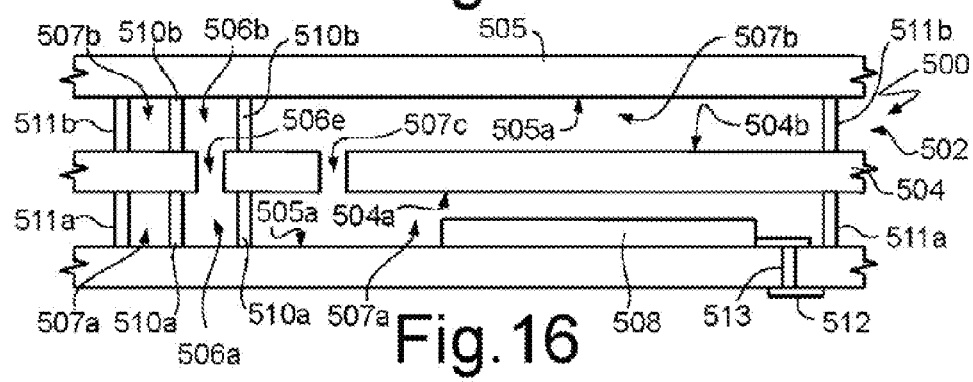
FIG. 16 is a cross section through the multilayer structure of FIG. 15, taken according to the line XVI-XVI of FIG. 15.
Figure 17:
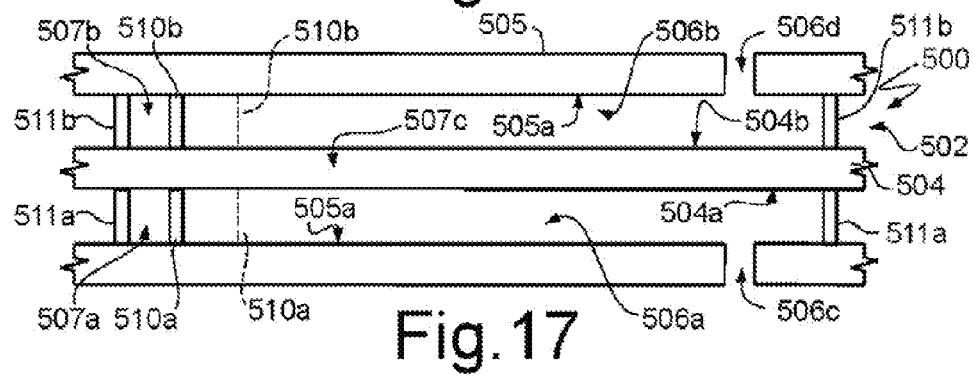
FIG. 17 is a cross section through the multilayer structure of FIG. 15, taken according to the line XVII-XVII of FIG. 15.

A further embodiment of the disclosure is illustrated in FIGS. 15-17. In this case, a multilayer structure 500 incorporates a plurality of microfluidic devices 502, only one of which is illustrated. In greater detail, the multilayer structure 500 comprises a first wafer 503, a second wafer 505, and an intermediate wafer 504, defined between which is the microfluidic device 502.

The microfluidic device 502 comprises a microfluidic circuit 506, here represented by way of example by a single microfluidic channel, a sealed chamber 507, and a pressure sensor 508.

The microfluidic circuit 506 comprises a first microfluidic channel 506a, defined between a face 503a of the first wafer 503 and a face 504a of the intermediate wafer 504, and a second microfluidic channel 506b, defined between a face 505a of the second wafer 505 and a face 504b of the intermediate wafer 504.

In addition, the first microfluidic channel 506a is delimited laterally by a sealing structure 510a, which extends along a closed line, is joined in a fluid-tight way to the first wafer 503 and to the intermediate wafer 504 and functions as spacer between them, and the second microfluidic channel 506b is delimited laterally by a sealing structure 510b, which extends along a closed line, is joined in a fluid-tight way to the second wafer 505 and to the intermediate wafer 504, and functions as spacer between them. An inlet 506c and an outlet 506d are provided at respective ends of the first microfluidic channel 506a and of the second microfluidic channel 506b, respectively through the first wafer 503 and through the second wafer 505. The first microfluidic channel 506a and the second microfluidic channel 506b are moreover fluidically coupled through a passage 506e provided in the intermediate wafer 504.

The sealed chamber 507 comprises a first portion 507a, defined between the first wafer 503 and the intermediate wafer 504, and a second portion 507b, defined between the second wafer 504 and the intermediate wafer 504.

In addition, the first portion 507a of the sealed chamber 507 is delimited laterally by a sealing structure 511a, which extends along a closed line surrounding the first microfluidic channel 506a, is joined in a fluid-tight way to the first wafer 503 and to the intermediate wafer 504, and functions as spacer between them, and the second portion 507b of the sealed chamber 507 is delimited laterally by a sealing structure 511b, which extends along a closed line surrounding the second microfluidic channel 506b, is joined in a fluid-tight way to the second wafer 505 and to the intermediate wafer 504, and functions as spacer between them. The multilayer structure 500 is obtained by bonding at a wafer level (wafer bonding) of the wafers 503, 504, 505 and of the sealing structures 510a, 510b, 511a, 511b (for example, by means of simultaneous gold-gold bonding of three wafers).

Alternatively, it is also possible in this case to exploit processes of bonding at a device level (chip-to-chip bonding) or at an intermediate level (chip-to-wafer bonding).

The first portion 507a and the second portion 507b of the sealed chamber 507 are fluidly coupled through a passage 507c in the intermediate wafer 504.

In the embodiment described here, the pressure sensor 508 is a membrane microelectromechanical sensor and is housed in the first portion 507a of the sealed chamber 507, on the first wafer 503.

Figure 18:
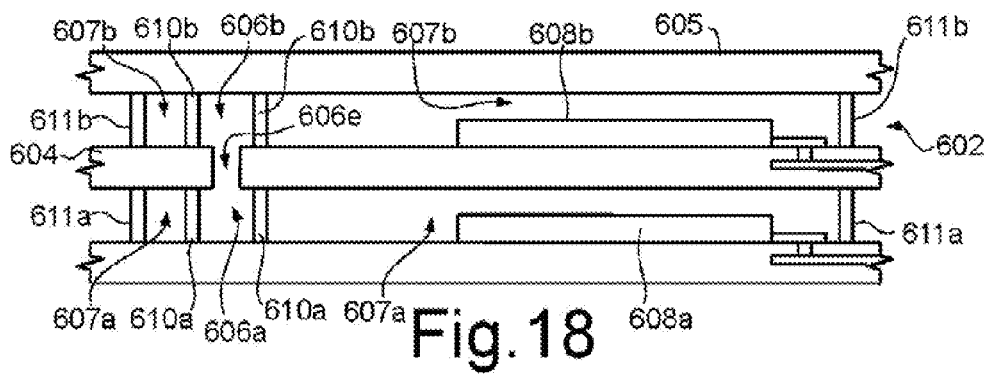
FIG. 18 is a cross section through a multilayer structure according to a seventh embodiment of the present disclosure.

In the embodiment of FIG. 18, a first sealed chamber 607a and a second sealed chamber 607b are defined, respectively, between the first wafer 603 and the intermediate wafer 604 and between the second wafer 605 and the intermediate wafer 604. The first sealed chamber 607a and the second sealed chamber 607b are fluidically uncoupled from one another and surround, respectively, the first microfluidic channel 606a and the second microfluidic channel 606b.

FIG. 17 also shows: a sealing structure 610a and a sealing structure 610b, which delimit respectively the first microfluidic channel 606a and the second microfluidic channel 606b; a sealing structure 611a, which extends around the first microfluidic channel 606a and delimits the first sealed chamber 607a laterally; and a sealing structure 611b, which extends around the second microfluidic channel 606b and delimits the second sealed chamber 607b laterally.

In this case, a first pressure sensor 608a and a second pressure sensor 608b are set, respectively, in the first sealed chamber 607a (for example, on the first wafer 603) and in the second sealed chamber 607b (for example, on the intermediate wafer 604).

Modifications and variations may be made to the multilayer structure and to the method described, without thereby departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A multilayer structure comprising:
a first microfluidic circuit;
a first sealing structure that delimits at least in part the first microfluidic circuit;
a first chamber delimited in part by the first sealing structure;
a second sealing structure that delimits in part the first chamber; and
a first sensor arranged in the first chamber and configured to provide a signal indicative of leakage between the first microfluidic circuit and the first chamber.

2. A multilayer structure according to claim 1, wherein the sensor is a pressure sensor.

3. A multilayer structure according to claim 2, wherein the sensor is a microelectromechanical sensor.

4. A multilayer structure according to claim 2, wherein the sensor is a Pirani sensor.

5. A multilayer structure according to claim 1, wherein the sensor is a sensor of presence of liquids.

6. A multilayer structure according to claim 5, wherein the sensor comprises a first conductive region and a second conductive region adjacent to one another and to the first sealing structure, electrically insulated from one another, and configured to be coupled to a power supply source to be biased at respective distinct voltages, and detect a conductive liquid leaked from the first microfluidic circuit that causes a short-circuit between the first conductive region and the second conductive region.

7. A multilayer structure according to claim 6, wherein the first conductive region and the second conductive region are comb-shaped and have a spine and a plurality of fingers each, and wherein the fingers of the first conductive region and the fingers of the second conductive region are intercalated.

8. A multilayer structure according to claim 1, comprising a first plate and a second plate, wherein the first sealing structure and the second sealing structure are interposed between the first plate and the second plate and are seal-bonded to the first plate and to the second plate.

9. A multilayer structure according to claim 8, wherein the first sealing structure and the second sealing structure extend along respective closed lines and the second sealing structure encloses the first sealing structure.

10. A multilayer structure according to claim 8, comprising a third sealing structure and a third plate interposed between the first plate and the second plate, and wherein the first microfluidic circuit comprises a first microfluidic channel, defined between the first plate and the third plate and laterally delimited by the first sealing structure, and a second microfluidic channel, fluidly coupled to the first microfluidic channel, defined between the second plate and the third plate and laterally delimited by the third sealing structure.

11. A multilayer structure according to claim 10, comprising a fourth sealing structure, wherein the first chamber comprises a first portion, defined between the first plate and the third plate and laterally delimited by the second sealing structure, and a second portion, fluidly coupled to the first portion, defined between the second plate and the third plate and laterally delimited by the fourth sealing structure.

12. A multilayer structure according to claim 10, wherein the first chamber is defined between the first plate and the third plate and is laterally delimited by the second sealing structure, the multilayer structure further comprising a fourth sealing structure and a second chamber, fluidly separate from the first chamber, defined between the second plate and the third plate, and laterally delimited by the fourth sealing structure, which encloses the third sealing structure.

13. A multilayer structure according to claim 12, wherein the first sensor is configured to provide a signal indicative of leakage between the first microfluidic channel and the first chamber, the multilayer structure comprising a second sensor arranged in the second chamber and configured to provide a signal indicative of leakage between the first microfluidic channel and the second chamber.

14. A multilayer structure according to claim 1, further comprising:
a second microfluidic circuit;
a third sealing structure that delimits at least in part the second microfluidic circuit;
a second chamber delimited in part by the third sealing structure;
a fourth sealing structure that delimits in part the second chamber; and a second sensor arranged in the first chamber and configured to provide a signal indicative of leakage between the second microfluidic circuit and the second chamber.

15. A system comprising:
a control unit and
a first microfluidic device coupled to the control unit and including:
a first microfluidic circuit;
a first sealed chamber, the first microfluidic circuit located inside of the first sealed chamber and fluidly isolated from the first sealed chamber; and
a first sensor arranged in the first sealed chamber and configured to provide a leakage signal indicative of leakage between the first microfluidic circuit and the first sealed chamber.

16. A system according to claim 15, further comprising
an electrical connection line electrically coupled to the sensor; and
a conductive contact electrically coupled via the electrical connection line to the sensor and electrically coupled to the control unit, the control unit being configured to receive the leakage signal from the first sensor via the electrical connection line and conductive contact.

17. A system according to claim 15, wherein the sensor comprises a first conductive region and a second conductive region adjacent to one another that are electrically insulated from one another, and configured to be coupled to a power supply source to be biased at respective distinct voltages, and detect a conductive liquid leaked from the first microfluidic circuit that causes a short-circuit between the first conductive region and the second conductive region.

18. A system according to claim 15, wherein the microfluidic device includes a first plate and a second plate, wherein a first sealing structure and a second sealing structure are interposed between the first plate and the second plate and are seal-bonded to the first plate and to the second plate, wherein the first sealing structure seals the first sealed chamber and the second sealing structure seals the first microfluidic circuit from the first sealed chamber.

19. A system according to claim 18, wherein the microfluidic device includes a third sealing structure and a third plate interposed between the first plate and the second plate, and wherein the first microfluidic circuit comprises a first microfluidic channel, defined between the first plate and the third plate and laterally delimited by the first sealing structure, and a second microfluidic channel, fluidly coupled to the first microfluidic channel, defined between the second plate and the third plate and laterally delimited by the third sealing structure.

20. A system according to claim 15, further comprising:
a second microfluidic device that includes:
a second microfluidic circuit;
a third sealing structure that delimits at least in part the second microfluidic circuit;
a second chamber delimited in part by the third sealing structure;
a fourth sealing structure that delimits in part the second chamber; and
a second sensor arranged in the second chamber and configured to provide a signal indicative of leakage between the second microfluidic circuit and the second chamber.

21. A method, comprising:
providing fluid through a microfluidic circuit of a microfluidic device, the microfluidic circuit being sealed from a chamber;
detecting leakage in the microfluidic device between the microfluidic circuit and the chamber using a sensor in the chamber, the detecting including:
sensing a quantity relating to the chamber and indicative of leakage between the microfluidic circuit and the chamber.

22. A method according to claim 21, wherein the sensing includes sensing a pressure in the chamber.

23. A method according to claim 21, comprising detecting a liquid in the chamber.

24. A method according to claim 21, comprising:
electrically coupling a control unit to a contact pad of the microfluidic device, the contact pad being electrically coupled to the sensor.

25. A microfluidic device comprising:
a sealed chamber;
a microfluidic circuit located inside the sealed chamber;
a sealing structure arranged between the microfluidic circuit and the chamber that fluidly isolates the microfluidic circuit from the chamber; and
a sensor arranged inside the chamber, the sensor configured to sense leakage between the microfluidic circuit and the chamber when a leak occurs and provide a signal indicative of the leakage.

26. The microfluidic device according to claim 25, wherein the sensor is at least one of a pressure sensor, microelectromechanical sensor, and Pirani sensor.

27. The microfluidic device according to claim 25, further comprising a first plate and a second plate, the sealing structure coupled to the first plate and the second plate to fluidly isolate the chamber from the microfluidic circuit.

28. The multilayer structure according to claim 1, wherein the first microfluidic circuit is located inside the first chamber.

* * * * *